(12) United States Patent
Thibault

(10) Patent No.: US 7,966,976 B2
(45) Date of Patent: Jun. 28, 2011

(54) SAFETY BYPASS GATE FOR EMERGENCY EXIT FROM WATERING AREA TO FEEDING AREA IN LIVESTOCK FACILITY

(75) Inventor: Ronald M. Thibault, Osborne, KS (US)

(73) Assignee: Osbourne Industries, Inc., Osborne, KS (US)

( * ) Notice: Subject to any disclaimer, the term of this patent is extended or adjusted under 35 U.S.C. 154(b) by 741 days.

(21) Appl. No.: 11/754,591

(22) Filed: May 29, 2007

(65) Prior Publication Data

US 2007/0277748 A1 Dec. 6, 2007

Related U.S. Application Data

(60) Provisional application No. 60/810,493, filed on Jun. 1, 2006.

(51) Int. Cl.
*A01K 29/00* (2006.01)

(52) U.S. Cl. ......... 119/842; 119/840; 119/502; 119/524

(58) Field of Classification Search .......... 119/840–843, 119/423–426, 502, 506, 510, 515, 14.03, 119/712, 524, 481, 511, 734, 735, 737, 906; 256/73; D25/50
See application file for complete search history.

(56) References Cited

U.S. PATENT DOCUMENTS

| | | | |
|---|---|---|---|
| 1,743,875 A * | 1/1930 | Bland | 119/424 |
| 2,414,984 A | 1/1947 | Steele | |
| 2,668,381 A | 2/1954 | Ferris | |
| 3,814,060 A * | 6/1974 | Swenson | 119/734 |
| 4,129,811 A | 12/1978 | Pearson | |
| 4,138,968 A | 2/1979 | Ostermann | |
| 4,145,994 A | 3/1979 | Miller | |
| 4,213,379 A * | 7/1980 | Cromley | 454/239 |
| 4,228,842 A | 10/1980 | Clark | |
| 4,302,908 A * | 12/1981 | Parker | 49/122 |
| 4,372,592 A | 2/1983 | Beese | |
| 4,904,880 A * | 2/1990 | Yoshida | 307/66 |
| 4,919,235 A | 4/1990 | DelSavio | |
| 5,183,008 A | 2/1993 | Carrano | |
| 5,579,719 A * | 12/1996 | Hoff et al. | 119/51.02 |

(Continued)

OTHER PUBLICATIONS

Gen II: The Ultimate Hog Sorting Machine, Sierens Equipment Ltd., Canada, user manual.

*Primary Examiner* — Andrea M Valenti
(74) *Attorney, Agent, or Firm* — Jeffrey L. Thompson; Thompson & Thompson, P.A.

(57) ABSTRACT

A safety bypass gate is provided for use with a livestock management system having a sorting scale arranged between watering and feeding areas. The safety bypass gate changes from a closed position to an open position to provide an emergency exit from the watering area when a condition exists that prevents animals from passing over the sorting scale. The safety bypass gate includes a pair of pivoting gate members and a channel member that fits over the top edges of the gate members to secure them closed. The channel member is attached to a pneumatic actuator that uses air pressure to hold the channel member in its locked position, and a spring return that moves the channel member to its unlocked position upon a drop in air pressure. Springs bias the gate members from their closed positions to their open positions when the channel member moves to its unlocked position.

7 Claims, 6 Drawing Sheets

U.S. PATENT DOCUMENTS

| | | |
|---|---|---|
| 6,239,711 B1 | 5/2001 | Downey et al. |
| 6,341,582 B1 | 1/2002 | Gompper et al. |
| 6,899,044 B2 | 5/2005 | Thibault et al. |
| 7,210,428 B2 | 5/2007 | Thibault |
| 7,464,666 B2 * | 12/2008 | Pratt ............................ 119/712 |
| 2003/0066492 A1 * | 4/2003 | Fransen et al. ................ 119/524 |
| 2003/0226522 A1 * | 12/2003 | Thibault ....................... 119/842 |

* cited by examiner

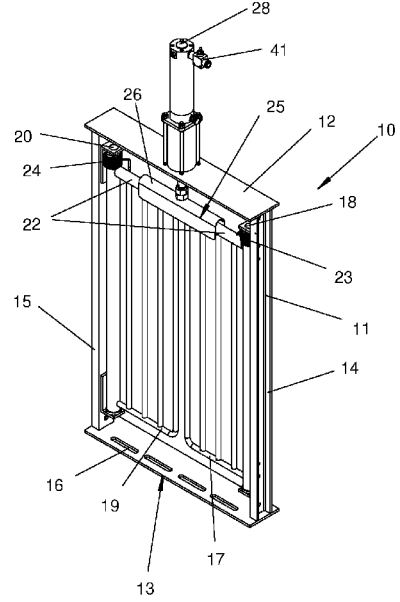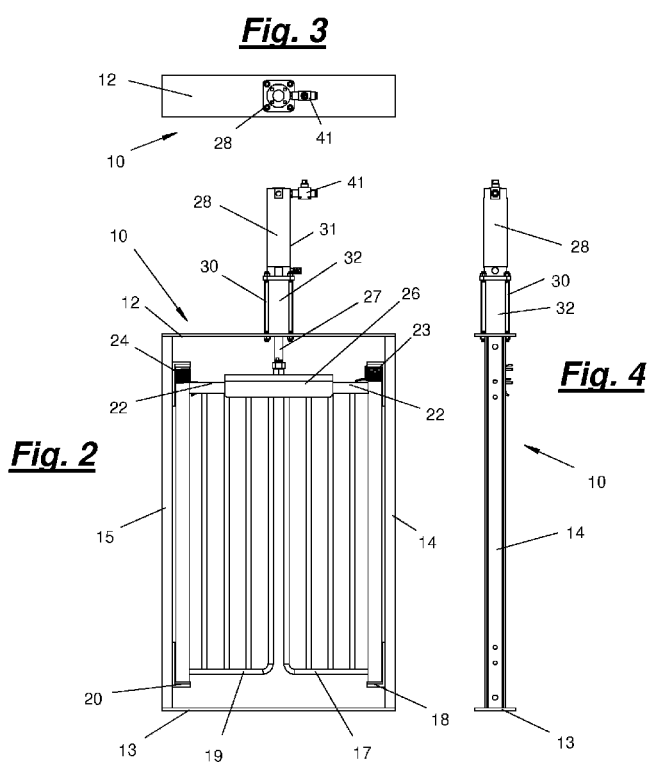

US 7,966,976 B2

SAFETY BYPASS GATE FOR EMERGENCY EXIT FROM WATERING AREA TO FEEDING AREA IN LIVESTOCK FACILITY

RELATED APPLICATIONS

This application claims the benefit under 35 U.S.C. 119(e) of U.S. Provisional Application No. 60/810,493 filed on Jun. 1, 2006.

BACKGROUND OF THE INVENTION

1. Field of the Invention

The present invention relates to livestock management systems and methods in which animals are kept in a pen having a watering area separate from a feeding area, and in particular, to a safety bypass gate used to provide an emergency passage for animals upon occurrence of abnormal events that block a normal passage across a sorting scale between the watering and feeding areas.

2. Description of the Related Art

Split-weight feeding systems using automated sorting mechanisms are used in livestock facilities to improve feeding efficiencies, to limit the weight distribution spread of the animals in the herd, and to reduce sort losses at market. An example of a split-weight feeding system is described in U.S. Pat. No. 7,210,428. This split-weight feeding system relies upon the continuous natural pattern of movement of the animals to water and then back to their preferred feeding area within a large pen configuration. The animals pass through a sorting mechanism (e.g., a scale with sorting gates) as they move between the watering and feeding areas.

Abnormal events can sometimes block the normal flow between the watering and feeding areas and raise the stress levels on the animals. Under some abnormal circumstances, the water pen may become overpopulated or the animals may be blocked from the feeding or watering areas, leading to animal injury or loss. To manage these problems, producers must walk their pens regularly and maintain close supervision to prevent or intercede if such abnormal events occur.

Accordingly, a need exists for a system that provides an improved measure of safety in an automated livestock feeding system, particularly when abnormal events occur that would otherwise tend to prevent animals from moving between their watering and feeding areas.

SUMMARY OF THE INVENTION

It is an object of the present invention to provide an apparatus and method for use in a livestock facility to provide an emergency passage between watering and feeding areas.

To accomplish this object, the Applicant has developed a safety bypass gate for use with a livestock management system having a sorting scale arranged between watering and feeding areas. The safety bypass gate changes from a closed position to an open position to provide an emergency exit from the watering area when a condition exists that prevents animals from passing over the sorting scale. The safety bypass gate includes a pair of pivoting gate members and a channel member that fits over the top edges of the gate members to secure them closed. The channel member is attached to a pneumatic actuator that uses air pressure to hold the channel member in its locked position, and a spring return that moves the channel member to its unlocked position upon a drop in air pressure. Springs bias the gate members from their closed positions to their open positions when the channel member moves to its unlocked position.

According to one aspect of the present invention, a livestock management system is provided, comprising: a feeding area; a watering area; a first passage between the watering area and the feeding area; a safety bypass gate having a closed position and an open position for allowing animals to pass through a second passage between the watering area and the feeding area; and a means for moving the gate from the closed position to the open position to provide an emergency exit through the second passage when the first passage becomes blocked.

According to another aspect of the present invention, a safety bypass gate for use in a livestock facility is provided, comprising: a first gate member mounted for pivotal movement about a first vertical axis along one side for movement between a closed position and an open position; a first spring arranged to bias the first gate member from its closed position to its open position; and a locking mechanism having a channel member that is movable between a locked position in which the channel member straddles a top edge of the gate member to hold the gate member in its closed position, and an unlocked position in which the channel member is disengaged from the gate member to allow the gate member to move to its open position.

According to yet another aspect of the present invention, a method of managing livestock is provided, comprising: providing a pen having a watering area separate from a feeding area; sorting animals as they pass between the watering and feeding areas; and opening a safety bypass gate between the watering and feeding areas upon occurrence of a condition that blocks a normal passage between the watering and feeding areas.

BRIEF DESCRIPTION OF THE DRAWINGS

The present invention will become more clearly appreciated as the disclosure of the present invention is made with reference to the accompanying drawings. In the drawings:

FIG. 1 is a perspective view of a safety bypass gate in its closed position according to the present invention.

FIG. 2 is a front elevation view of the safety bypass gate shown in FIG. 1.

FIG. 3 is a plan view of the safety bypass gate shown in FIG. 1.

FIG. 4 is a side elevation view of the safety bypass gate shown in FIG. 1.

DETAILED DESCRIPTION OF THE INVENTION

Figure 5:
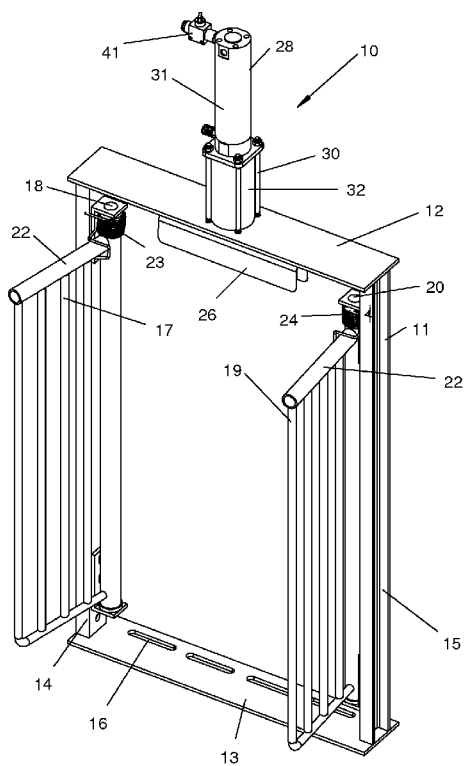
FIG. 5 is a perspective view of the safety bypass gate in its open position.

A safety bypass gate and livestock management system according to the present invention will now be described in detail with reference to FIGS. 1 to 10 of the accompanying drawings.

As shown in FIGS. 1 to 7, the safety bypass gate 10 includes a frame 11 comprising top and bottom frame members 12, 13, and right and left vertical side frame members 14, 15. Floor anchor holes 16 are provided in the bottom frame member 13 to secure the gate 10 to the floor of a pen in which it is used. The vertical side frame members 14, 15 can also be fastened to pen dividers, walls, or stationary posts to secure the bypass gate 10 in a desired location.

Figure 6:
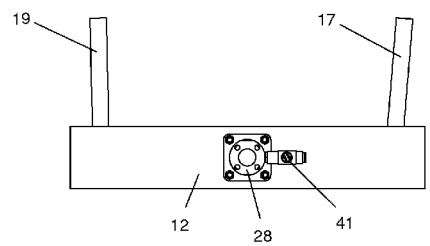
FIG. 6 is a plan view of the safety bypass gate shown in FIG. 5.
Figure 7:
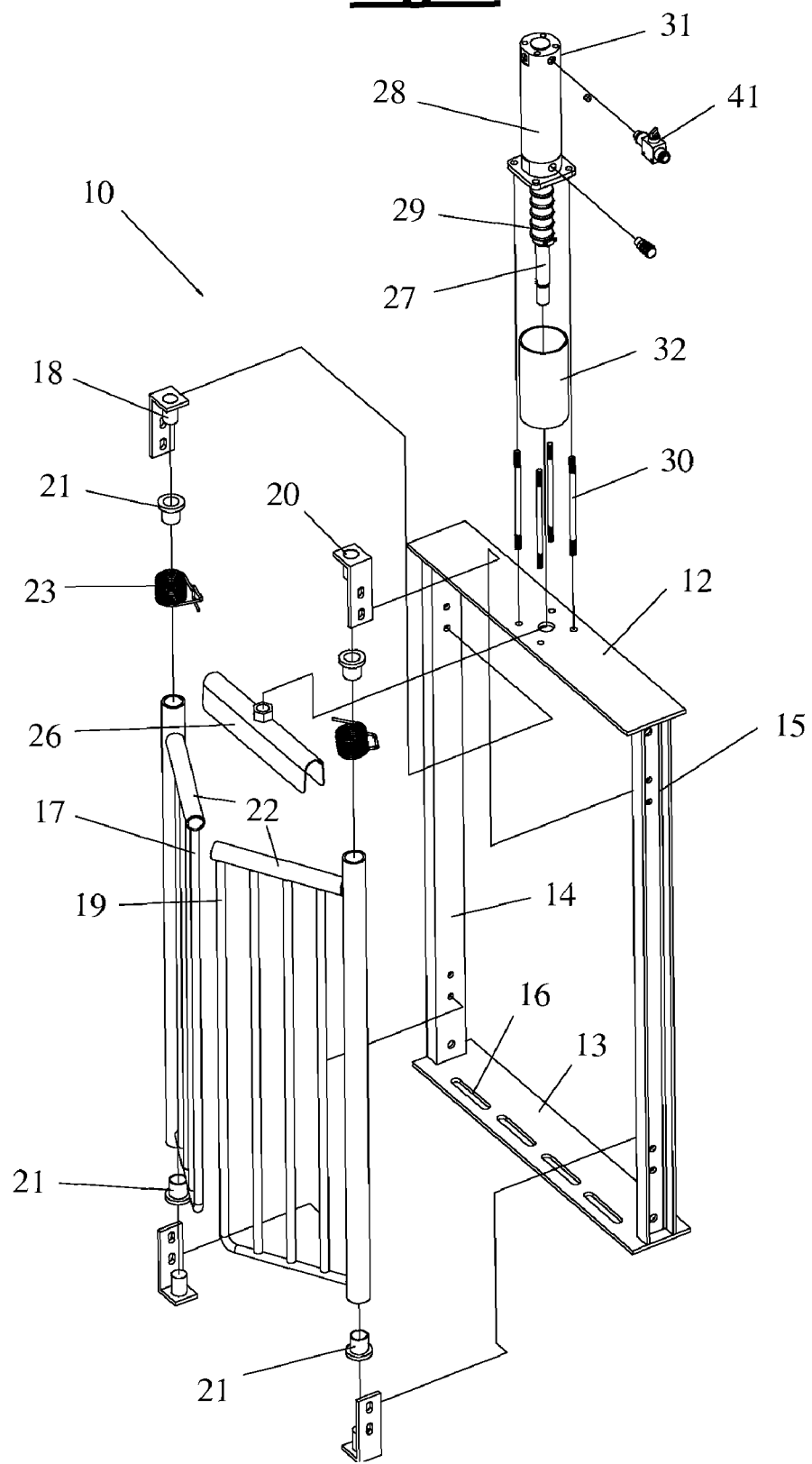
FIG. 7 is an exploded perspective view of the safety bypass gate according to the present invention.

A first gate member 17 is mounted to the right side frame member 14 using a first hinge 18 for pivotal movement about a first vertical axis. A second gate member 19 is mounted to the left side frame member 15 using a second hinge 20 for pivotal movement about a second vertical axis. Bushings 21 can be used in the hinges 18, to ensure smooth pivotal movement of the gate members 17, 19. The first and second gate members 17, 19 are movable about the first and second hinges 18, 20, respectively, between a closed position (FIGS. 1 to 4) and an open position (FIGS. 5 and 6). In the closed position, the top edges 22 of the gate members 17, 19 are generally aligned with each other. First and second coil springs 23, 24 are arranged on the first and second hinges 18, 20 for biasing the gate members 17, 19 toward their open position to encourage animal flow when the bypass gate 10 is unlocked.

A locking mechanism 25 is provided for holding the gate members 17, 19 in their closed position during normal operation, and for releasing the gate members 17, 19 to their open position to provide an emergency exit when abnormal conditions exist. The locking mechanism 25 includes a gate locking channel member 26 that is in a locked position when lowered and an unlocked position when raised. In the locked position, the channel member 26 straddles the top edges 21, 22 of the gate members 17, 19 with opposing surfaces of the channel member 26 engaging front and back sides of the gate members 17, 19 to hold the gate members 17, 19 in their closed position. In the unlocked position, the channel member 26 is raised and disengaged from the gate members 17, 19 to allow the gate members 17, 19 to move to their open position.

The channel member 26 is attached to a cylinder rod 27 of a pneumatic actuator 28, which uses air pressure to extend the cylinder rod 27 to hold the channel member 26 in its lowered, locked position. A return spring 29 is provided within the pneumatic actuator 28 to retract the cylinder rod 27 to move the channel member 26 to its raised, unlocked position upon a drop in air pressure. The actuator 28 is attached to the top frame member 12 by threaded fasteners 30. As explained below, various abnormal conditions in the livestock facility may be detected and used as a trigger to unlock the locking mechanism 25 and open the gate members 17, 19 of the bypass gate 10. For example, the abnormal conditions can include a loss of air pressure, loss of electric power, and/or activation of an idle alert function in the controller of a sorting scale.

Because the pneumatic actuator 28 is exposed to an aggressive, dusty environment, the part of the cylinder rod 27 that is retracted into the cylinder 31 of the actuator 28 is protected by a rubber boot 32 and is not exposed to the animals or dust. The cylinder rod 27 of the actuator 28 is preferably made of stainless steel to prevent corrosion over time. The hinge springs 23, 24 for the gate members 17, 19 are also preferably made of stainless steel.

As described above, the safety bypass gate 10 of the present invention does not rely on air pressure to hold the gate members 17, 19 in position; instead it relies on the mechanical interaction between the channel member 26 and the top edges 22 of the gate members 17, 19. This arrangement makes the gate 10 resistant to cylinder leakage or deterioration over time, and changes in air pressure have no effect until the force delivered by the air pressure drops below the force of the return spring 29. At that point, the channel member 26 is withdrawn and the gate 10 is allowed to open, with the gate hinge springs 23, 24 functioning to fully open the gate 10. Even if the gate hinge springs 23, 24 are damaged, the gate 10 can be fully opened easily by the animals once the channel member 26 is disengaged.

Figure 8:
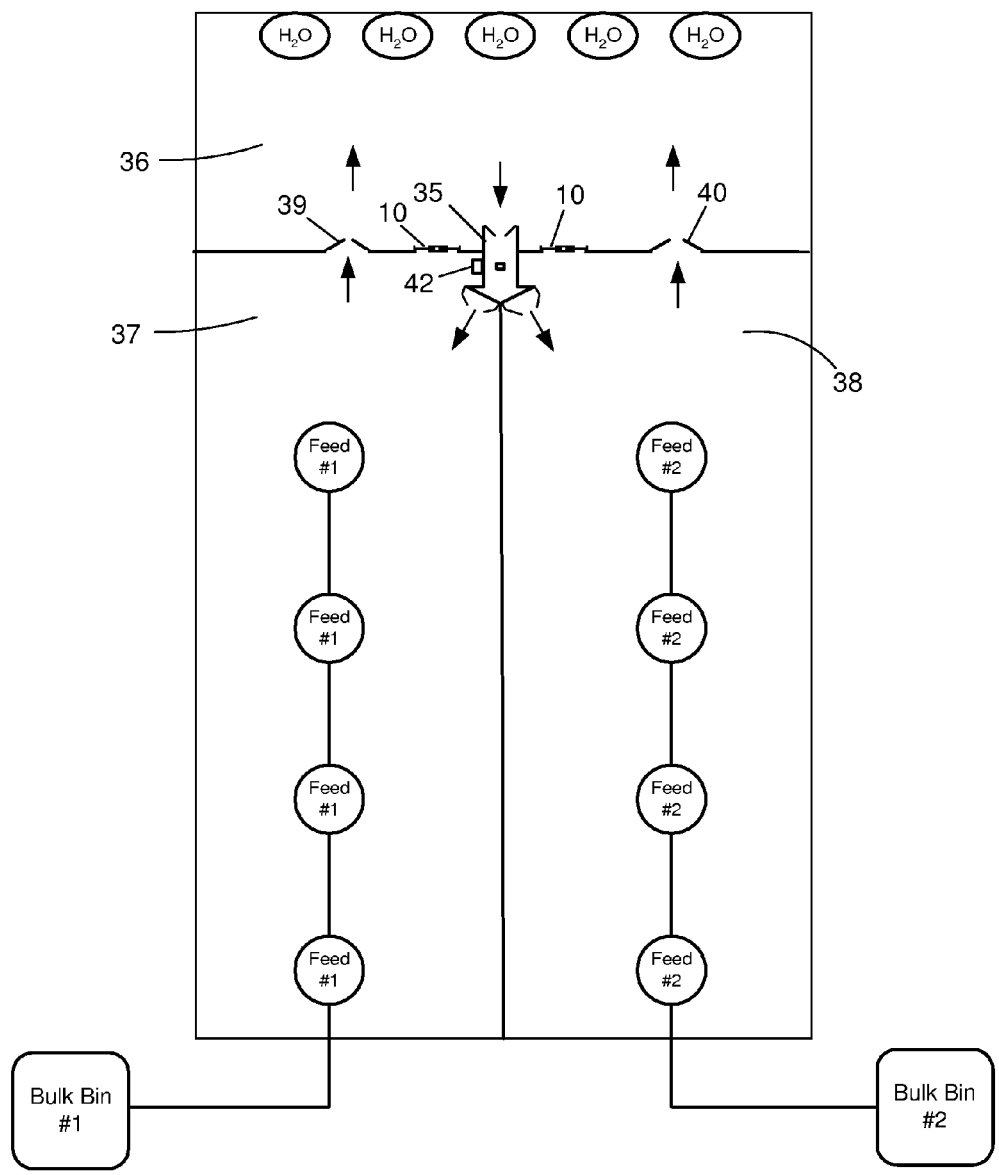
FIG. 8 is a diagrammatic plan view of a pen layout for a livestock management system using the safety bypass gate according to the present invention.

The safety bypass gate 10 described above is particularly suitable for use in a livestock facility having a sorting scale 35 arranged between a common watering area 36 and first and second feeding areas 37, 38, as shown in FIG. 8. An example of such a livestock facility is disclosed, for example, in the Applicant's U.S. Pat. No. 7,210,428, which is incorporated herein by reference. Such a livestock facility has been used effectively for raising pigs and relies upon the continuous natural pattern of movement of the pigs to water and then back to their preferred feeding area within a large pen configuration. For example, the common watering area 36 may comprise about 20% of the total pen area, while the feeding areas 37, 38 may comprise the other 80% of the total pen area, and groups of 500 to 600 pigs may be kept in the pen.

One or more safety bypass gates 10 can be used in such a livestock facility to provide an emergency exit from the watering area 36 whenever abnormal conditions exist that prevent animals from passing over the sorting scale 35 to return to the feeding areas 37, 38. When such abnormal conditions exist, the normal flow of animals is blocked, the stress levels on the animals increases, and the watering area 36 may become overpopulated, leading to animal injury or loss. While the sorting scale 35 provides a first, primary passage from the watering area 36 back to the feeding areas 37, 38, the safety bypass gate 10 provides a second, emergency passage when the first passage through the scale 35 becomes blocked.

With the safety bypass gates 10 in their closed position, as shown in FIG. 8, the animals will have a normal routine of passing from the feeding areas 37, 38 through one-way gates 39, 40 into the common watering area 36, and then return to the feeding areas 37, 38 through the sorting scale 35. The sorting scale 35 has a first sorting position for causing animals to pass from the watering area 36 to the first feeding area 37, and a second sorting position for causing animals to pass from the watering area 36 to the second feeding area 38. The sorting scale 35 can be used to sort the animals into different feeding groups based on their detected weights or other predetermined sorting criteria.

Figure 9:
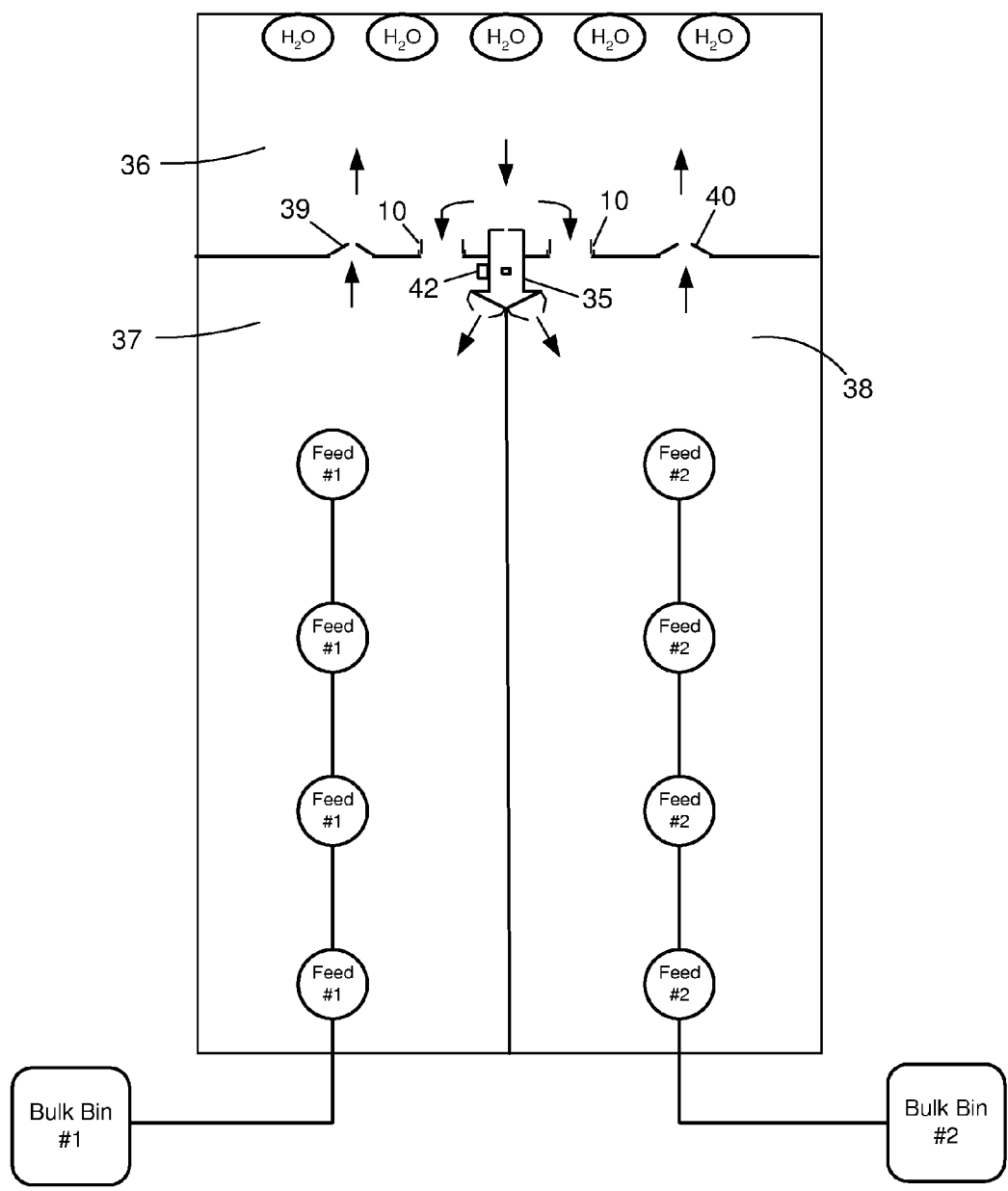
FIG. 9 is a diagrammatic plan view of the pen layout shown in FIG. 8 with the safety bypass gate in its open position.
Figure 10:
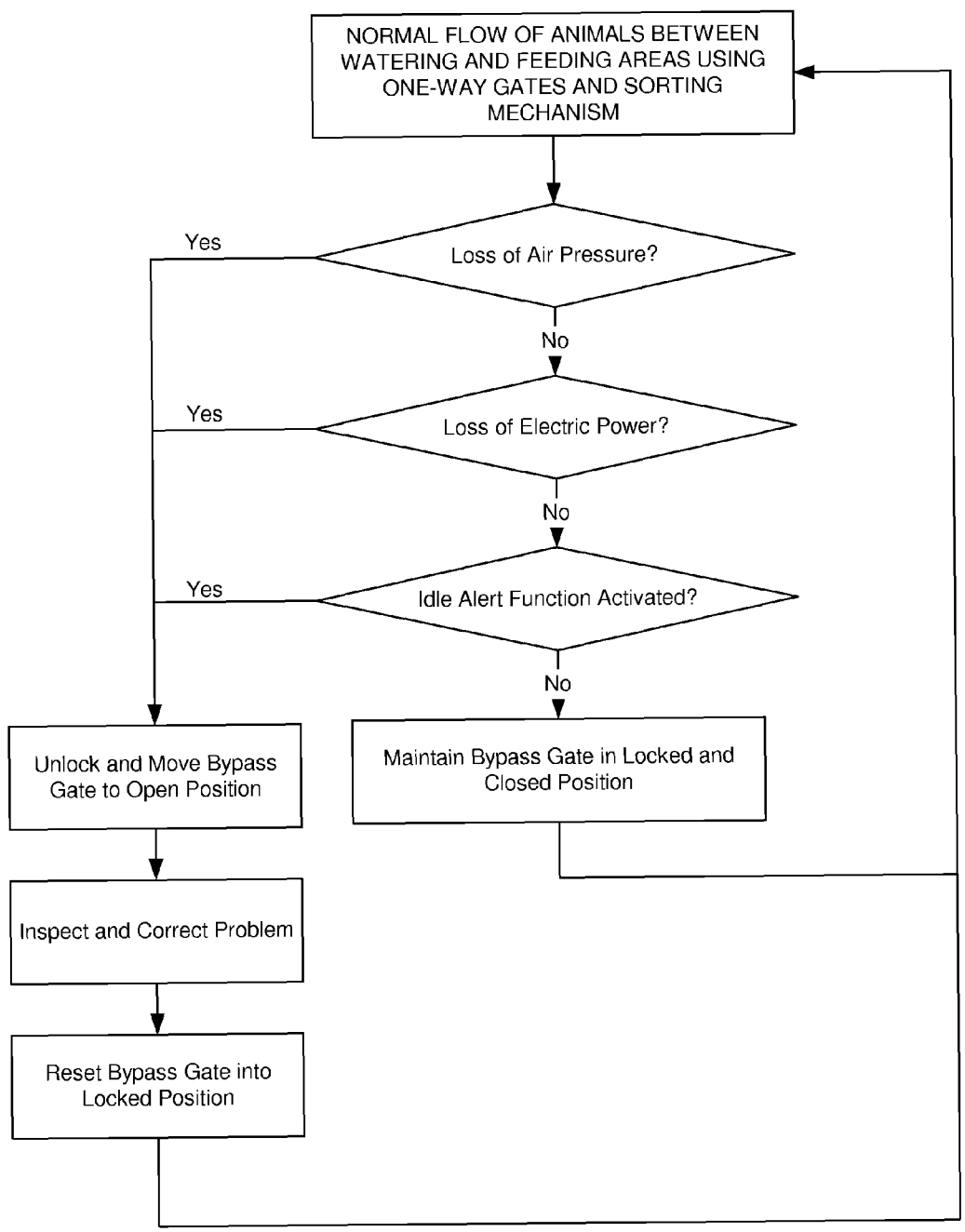
FIG. 10 is a flow chart showing the operation of the safety bypass gate in a livestock management system according to the present invention.

A number of different events or conditions can be used as a trigger to allow the safety bypass gates 10 to move from their closed positions to their open positions, as shown in FIG. 9, to allow animals to exit from the watering area 36 without passing over the sorting scale 35. As depicted in the flowchart of FIG. 10, these events/conditions include: (1) loss of air pressure; (2) loss of electric power; and (3) activation of an idle alert function caused by below-normal scale use rates (e.g., mechanical damage or blockage of the sorting scale, load cell failure, incorrect controller settings, etc.). A brief discussion of each of these events/conditions will be provided below to aid in better understanding the invention.

Loss of Air Pressure

This event may occur if the air compressor fails and no back-up, standby compressor exists, or if an air line breaks, or if power to the compressor(s) is interrupted. If the sorting scale 35 is pneumatically operated, it will be unable to actuate its gates and may go into a "limp mode" in which the entrance and exit gates can be operated by the animals. If the total animal population in the pen is high and normal traffic through the scale 35 is high, then passage through the scale 35 may be too slow to prevent overcrowding in the watering area 36. Since the safety bypass gate 10 is held in its closed, locked position by maintaining air pressure at the pneumatic actuator 28, the gate 10 will automatically unlock and open to relieve the watering area 36 as soon as the air pressure drops below the force of the return spring 29 of the actuator 28.

Loss of Electric Power

This event may occur if electric power is lost, a supply transformer fails, a circuit breaker is opened, or any other cause interrupts power to the sorting scale 35. The sorting scale 35 can be made to respond to power loss by releasing air pressure at the scale and going into "limp mode." By connecting the safety bypass gate 10 to the same air pressure line used by the sorting scale 35, the safety bypass gate 10 will automatically unlock upon the release of air pressure at the scale 35 for an added measure of safety for high usage facilities.

Mechanical Damage to Sorting Scale Interrupting Use

If mechanical damage to the sorting scale 35 occurs (e.g., broken parts blocking the passage), a controller 42 associated with the sorting scale 35 notes the interruption using its idle alert function. Upon activation of the idle alert function, the survey scale 35 automatically goes into "limp mode" to release the safety bypass gate 10 until the sorting scale 35 can be repaired.

Blockage of Sorting Scale

The sorting scale 35 may become blocked if an animal dies in the sorting scale 35 or next to its entry, or if penning or any other object is accidentally lodged within the scale 35. When such an event occurs, the idle alert function of the controller 40 of the sorting scale 35 can be activated, causing the sorting scale 35 to go into "limp mode" to release the safety bypass gate 10.

Load Cell Failure

If the load cell on the sorting scale 35 is destroyed by lightning or corrosion or is accidentally disconnected, then the idle alert function of the controller 40 can be activated and the sorting scale can go into "limp mode" to release the safety bypass gate 10.

Incorrect Controller Settings

If the user chooses certain settings on the controller 40 for the sorting scale 35, these settings may lead to lack of use of the sorting scale 35. Then in some cases, the idle alert function of the controller 40 may be activated causing the sorting scale 35 to go into "limp mode" to release the safety bypass gate 10.

Upon occurrence of any one of these events/conditions, the safety bypass gates 10 are automatically unlocked and moved into their open positions, as shown in FIG. 9. The animals are then allowed to pass freely through the bypass gate 10 as necessary to continue their normal pattern of movement between the watering area 36 and the feeding areas 37, 38. This relieves the emergency situation that might otherwise result if the watering area 36 becomes overpopulated, or if animals are prevented from accessing their feed in the feeding areas 37, 38. The user can then inspect and correct the problem, and then reset the safety bypass gates 10 into their closed and locked position.

The safety bypass gate 10 is reset by first disconnecting air pressure from the pneumatic actuator 28 using a manual air valve 41. The gate members 17, 19 are then gathered together under the channel member 26 and, when aligned, the air pressure is reconnected using the manual air valve 41 to lower the channel member 26 into locking engagement with the top edges 21, 22 of the gate members 17, 19. Of course, it is important to keep fingers and hands clear of the channel member 26 to avoid personal injury as the channel member 26 re-engages the gate members 17, 19.

As shown in FIGS. 8 and 9, the safety bypass gates 10 are located immediately next to the sorting scale 35. It is believed that the animals will tend to use the safety bypass gates 10 more effectively in this position as the animals develop the habit of seeking an exit from the watering area 36 at the sorting scale 35.

One safety bypass gate 10 may be sufficient to provide a measure of safety until an abnormal condition is corrected in the livestock facility (e.g., all of the animals could be kept temporarily in just one of the feeding areas 37, 38). However, the use of two safety bypass gates 10, as shown in FIGS. 8 and 9, will provide an added measure of safety and will eliminate the possibility of the animals becoming overcrowded and unduly stressed before the abnormal condition is corrected. In an alternative arrangement, a first safety bypass gate 10 can be located between the watering area 36 and one of the feeding areas 37, and a second safety bypass gate 10 can be located between the two feeding areas 37, 38. When two or more safety bypass gates 10 are used, they can be connected to the same source of air pressure so that they are activated simultaneously.

It is also noted that pen layouts using three and four way sorts are possible using the technology described in Applicant's U.S. Pat. No. 7,210,428. In this case, additional safety bypass gates 10 can be used to ensure that animals are allowed emergency access to the additional feeding areas during abnormal conditions.

While the invention has been described in connection with specific embodiments thereof, it is to be understood that this is by way of illustration and not of limitation, and the scope of the appended claims should be construed as broadly as the prior art will permit.

What is claimed is:

1. A livestock management system, comprising:
a feeding area;
a watering area;
a one-way gate for allowing animals to pass from said feeding area into said watering area;
a first passage for allowing animals to pass from said watering area into said feeding area;
a safety bypass gate having a closed position and an open position for allowing animals to pass through a second passage between the watering area and the feeding area, said safety bypass gate being separate from said one-way gate;
whereby said gate moves from said closed position to said open position to provide an emergency exit through said second passage when said first passage becomes blocked; said safety by pass gate includes a pair of pivoting gate members and a channel member having opposing surfaces that fits over top edges of said gate members to secure the gate in said closed position, said opposing surfaces of said channel member directly engages a front and a back side of the pair of gate members when in said closed position; said safety bypass gate having a first and a second gate hinge spring that respectively biases said gate members from their closed position to their open position when said channel member moves to a raised unlocked position; said channel member attached to a vertically positioned cylinder rod of a pneumatic actuator and said cylinder rod holds said channel member in its lowered locked position, a return spring in said pneumatic actuator retracts said cylinder rod to move said channel member to its raised unlocked position upon a drop in air pressure.

2. The livestock management system according to claim 1, further comprising a sorting mechanism for sorting animals as the animals pass through said first passage.

3. The livestock management system according to claim 2, wherein said feeding area comprises first and second feeding areas, and said sorting mechanism has a first sorting position for causing animals to pass from the watering area to the first feeding area, and a second sorting position for causing animals to pass from the watering area to the second feeding area.

4. The livestock management system according to claim 2, wherein said sorting mechanism includes a scale and is operable to sort animals into different feeding groups based on weight.

5. The livestock management system according to claim 1, wherein said loss of air pressure is responsive to a power failure.

6. The livestock management system according to claim 1, wherein said loss of air pressure is responsive to a drop in pressure in a pneumatic system used to operate other parts of the system.

7. The livestock management system according to claim 2, further comprising a controller having an idle alert function associated with said sorting mechanism, wherein said loss of air pressure is responsive to said idle alert function, said idle alert function being activated by below-normal use rates of the sorting mechanism.

* * * * *